(12) United States Patent
Taurand

(10) Patent No.: US 7,199,564 B2
(45) Date of Patent: Apr. 3, 2007

(54) ALTERNATING CURRENT CONVERTER

(75) Inventor: Christophe Taurand, Valence (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/574,503

(22) PCT Filed: Jul. 19, 2004

(86) PCT No.: PCT/EP2004/051543

§ 371 (c)(1),
(2), (4) Date: Apr. 3, 2006

(87) PCT Pub. No.: WO2005/034320

PCT Pub. Date: Apr. 14, 2005

(65) Prior Publication Data

US 2007/0014135 A1 Jan. 18, 2007

(30) Foreign Application Priority Data

Oct. 3, 2003 (FR) .................................. 03 11622

(51) Int. Cl.
*G05F 1/40* (2006.01)
(52) U.S. Cl. ....................................... 323/272; 323/224
(58) Field of Classification Search ................ 323/272, 323/224, 222, 271
See application file for complete search history.

(56) References Cited

U.S. PATENT DOCUMENTS 5,602,464 A * 2/1997 Linkowsky et al. ........ 323/272

FOREIGN PATENT DOCUMENTS

| EP | 0 295 858 | 12/1988 |
| EP | 1 199 788 A | 4/2002 |

* cited by examiner

*Primary Examiner*—Shawn Riley
(74) *Attorney, Agent, or Firm*—Lowe Hauptman & Berner, LLP

(57) ABSTRACT

Voltage booster converter comprising a pair of input terminals A and B for connecting a DC input voltage Vin between these two terminals; a pair $P_0$ of switches SB, SH in series connected by the switch SB to the input terminal B, the input terminal A being connected across an input inductor Lin to the connection point between the two switches SB and SH in series, each switch SB, SH comprising a control input so as to be placed simultaneously, one in an on state the other in an isolated state; a pair of output terminals C and D, for powering, by an output voltage Vout, a load Rout, the output terminal D being connected to the input terminal B; K other additional pairs $P_1, P_2, \ldots P_i, \ldots P_{K-1}, P_K$ of switches in series between the output terminal C and the free side of the switch SH with i=1, 2, ... K−1, K, the two switches of one and the same additional pair $P_i$ being connected across an energy recovery inductor $Lr_1$; K input groups, $Gin_1$, $Gin_2, \ldots Gin_i, \ldots Gin_{K-1}, Gin_K$, of Ni capacitors C of like value each in series, with i=1, 2, ... K−1, K and Ni=i; K output groups, $Gout_1, Gout_2, \ldots Gout_i, \ldots Gout_{K-1}, Gout_K$, of Mi capacitors C of like value each in series, with i=1, 2, ... K and Mi=(K+1)−i. The switches of these other K additional pairs are controlled simultaneously by the first and second complementary control signals.

13 Claims, 11 Drawing Sheets

ALTERNATING CURRENT CONVERTER

FIELD OF THE INVENTION

The invention relates to a voltage booster converter, or "boost converter", making it possible to obtain from a DC input voltage a DC output voltage of higher value than the supply voltage.

BACKGROUND OF THE INVENTION

In order to power certain electronic devices, in particular those intended for aeronautics, it sometimes proves to be necessary to generate electric voltages of high level, from a low-voltage common supply generator. The "boost converters" used for this purpose are chopper converters that are nonisolated so as to retain high efficiencies and small dimensions.

FIG. 1a shows a basic diagram of a voltage booster converter of the prior art.

The circuit of FIG. 1a is powered, via two input terminals A and B, by a generator E of DC input voltage Vin and provides a DC output voltage Vout on a load Rout in parallel with a capacitor Cout. The positive pole of the generator E is connected, across an inductor Lin and a diode Dd, to a terminal C of the resistor Rout in parallel with the capacitor Cout, the other terminal D of the resistor Rout being connected to the negative pole of the generator E. A switch Int connected, on the one hand, to the connection point of the inductor Lin and the diode Dd, and, on the other hand, to the negative pole of the generator E, periodically places the inductor Lin in parallel with the generator E.

The switch Int is turned on for the time Ton and open for the time Toff. The diode Dd is conducting for the time Toff and open for the time Ton. We refer to $\alpha=\text{Ton}/(\text{Ton}+\text{Toff})$ as the duty ratio.

FIG. 1b shows the control signal of the switch Int of the "boost converter".

When Int is closed, for the time Ton, the inductor Lin sees at its terminals the voltage Vin of the generator E. The current ILin in this inductor increases by the value:

$$\Delta I L i n_{Ton} = V\text{in}.T\text{on}/L\text{in}$$

When the switch Int is open and the diode Dd conducts, that is to say for the time Toff, the inductor Lin sees at its terminals the difference between the input voltage Vin and the output voltage Vout. The current ILin in this inductor therefore decreases by the value:

$$\Delta I L i n_{Toff} = ((V\text{in} - V\text{out}).T\text{off})/L\text{in}$$

The equilibrium state is attained when the sum of these two variations is zero, i.e.:

$$((V\text{in} - V\text{out}).T\text{off})/L\text{in} + V\text{in}.T\text{on}/L\text{in} = 0$$

which leads to the expression for the equilibrium voltage:

$$V\text{out} = V\text{in}/(1-\alpha)$$

$\alpha$ lying between 0 and 1, the output voltage Vout is therefore higher than the input voltage Vin, the structure of FIG. 1a is that of a voltage booster.

FIG. 1c shows the current in the "boost converter" of FIG. 1a.

In practice, the switch Int may advantageously be embodied by semiconductors. Mention may be made, in a nonlimiting manner, of MOS and bipolar transistors, IGBTs or MCTs.

The voltage booster converters of the prior art comprise limitations. Specifically, it is difficult to obtain voltage ratios Vout/Vin of greater than 5 while retaining optimal converter efficiency. Specifically, the switch is subjected at one and the same time to very large currents and high voltages.

Other nonisolated structures may be used. Mention may for example be made of the autotransformer type boost converter or the placing of two boost converters in series. Unfortunately, none of these solutions exhibits the expected efficiency performance.

SUMMARY OF THE INVENTION

In order to alleviate the drawbacks of the voltage booster devices of the prior art, the invention proposes a voltage booster converter comprising:

a pair of input terminals A and B for connecting a DC input voltage Vin between these two terminals;

a pair $P_0$ of switches SB, SH in series connected by the switch SB to the input terminal B, the input terminal A being connected across an input inductor Lin to the connection point between the two switches SB and SH in series, each switch SB, SH comprising control means so as to be placed simultaneously, one in an on state the other in an isolated state;

a pair of output terminals C and D, for powering, by an output voltage Vout, a load Rout, the output terminal D being connected to the input terminal B, comprising:

K other additional pairs $P_1, P_2 \ldots P_i, \ldots P_{K-1}, P_K$ of switches in series with the pair $P_0$ between the output terminal C and the switch SH with $i=1, 2, \ldots K-1, K$, the two switches of one and the same additional pair $P_i$ being connected across an energy recovery inductor $Lr_i$;

K input groups, $Gin_1, Gin_2, \ldots Gin_i, \ldots Gin_{K-1}, Gin_K$, of Ni capacitors C of like value each in series, with $i=1, 2, \ldots K-1, K$ and $Ni=i$, the electrode of the capacitors of one of the two ends of each input group being connected to the common point between the two switches SB, SH of the pair $P_0$, at least the electrode of the capacitors of each of the other ends of the input groups being connected respectively to the common point between each the switch $SH_i$ and the recovery inductor $Lr_i$ of the corresponding pair $P_i$ of like rank i, K output groups, $Gout_1, Gout_2, \ldots Gout_i, \ldots Gout_{K-1}, Gout_K$, of Mi capacitors C of like value each in series, with $i=1, 2, \ldots K$ and $Mi=(K+1)-i$, the electrode of the capacitors of one of the two ends of the output groups being connected to the output terminal C, at least the electrode of the capacitors of each of the other ends of the output groups being connected respectively to the connection point between two pairs of consecutive switches $P_{i-1}$ and $P_i$;

in that the switches of these other K additional pairs are controlled so as to form, when the switch SB of the pair $P_0$ linked to the terminal B is switched to the on state for a time Ton, a first capacitor network connected on the one hand across the switch SB to the terminal B and, on the other hand, to the terminal C, comprising the groups of input capacitors in series with the groups of the output capacitors such that a group of input capacitors $Gin_i$ is in series with its respective group of output capacitors $Gout_i$, and in that when the switch SB of the pair $P_0$ linked to the input terminal B is switched to the isolated state for a time Toff these other K pairs of switches form a second capacitor network connected to the terminal A across the input inductor Lin comprising the input group GinK in parallel with the output group $Gout_1$, in parallel with groups of input capacitors in series with groups of the output capacitors such that a group of input capacitors $Gin_{i-1}$ is situated in series with a group of output capacitors $Gout_i$.

The voltage Vout at the output of the converter is dependent on the duty ratio $\alpha=Ton/(Ton+Toff)$, the capacitors C of the networks having one and the same value, the voltage Vout is given by the relation:

$$Vout=(Vin/(1-\alpha)).(K+1).$$

The switches comprise a control input (control means) so as to be placed simultaneously, one in an on state through the application to its control input of a first control signal, the other in an isolated state by the application to its control input of a second control signal complementary to the first.

In practice, the switches may advantageously be embodied by semiconductors. Mention may be made, in a nonlimiting manner, of MOS and bipolar transistors, IGBTs or MCTs.

The converter furthermore comprises an output filtering capacitor Cout in parallel with the load Rout between the output terminals C and D.

In an embodiment of a booster converter, according to the invention, providing a positive output voltage Vout, the potential of the terminal A is greater than the potential of the terminal B, the potential of the output terminal C is greater than the potential of the output terminal D.

In another embodiment of a voltage booster converter, according to the invention, providing a negative voltage, the potential of the terminal A is less than the potential of the terminal B, the potential of the output terminal C is then less than the potential of the output terminal D.

BRIEF DESCRIPTION OF DRAWINGS

The invention will be better understood with the aid of exemplary embodiments according to the invention, with reference to the indexed drawings, in which:

FIG. 1b shows the control signal of the switch Int of the "boost converter" of FIG. 1a;

FIG. 1c shows the current in the "boost converter" of FIG. 1a;

FIG. 3b shows the structure of a negative version of the converter of FIG. 3a;

FIG. 4a shows a simplified structure of the voltage booster converter of FIG. 3a;

FIG. 4b shows the structure of a negative version of the converter of FIG. 4a;

FIG. 5d shows a simplified version of the voltage booster converter of FIG. 5a;

FIG. 7 shows the control signals of the switches SB and SB1 of the converter of FIG. 5a;

FIG. 8 shows the variation of the current in the energy recovery inductor of the converter of FIG. 5a;

FIG. 10b represents the negative version of the converter of FIG. 10a;

DETAILED DESCRIPTION OF EMBODIMENTS

Figure 1A:
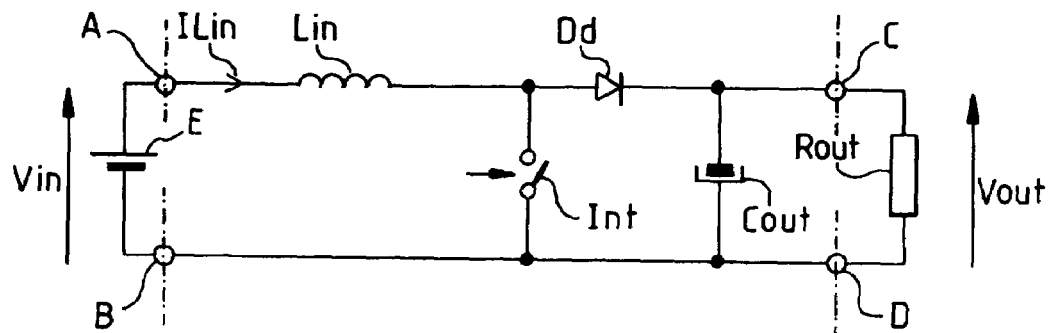
FIG. 1a, already described, shows a basic diagram of a voltage booster converter according to the prior art.
Figure 1B:
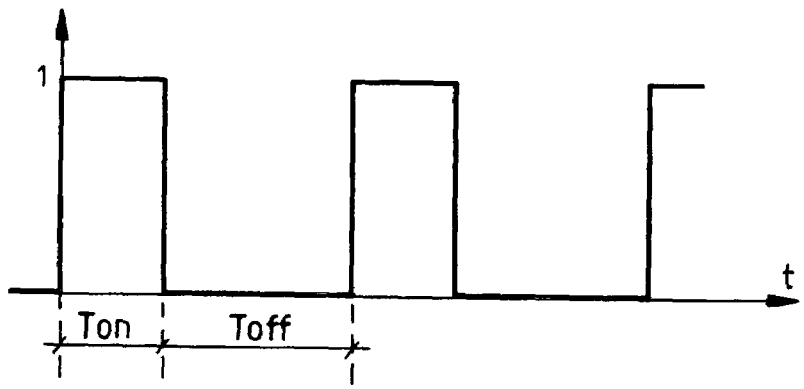
Figure 1C:
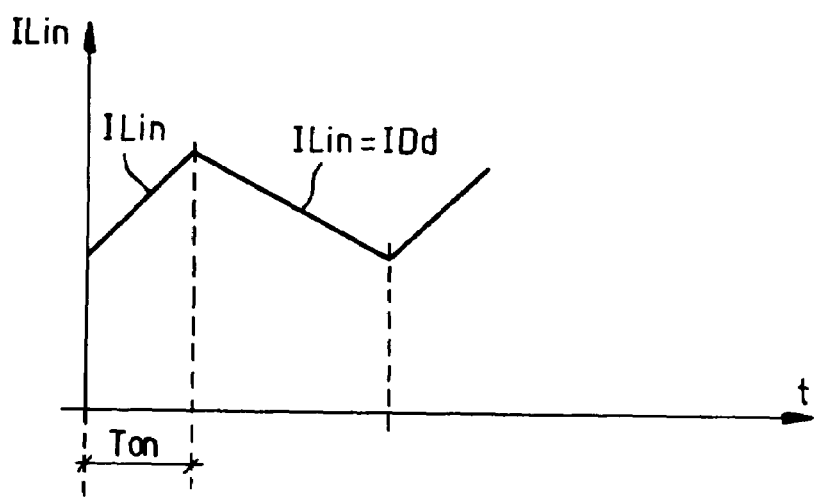
Figure 2:
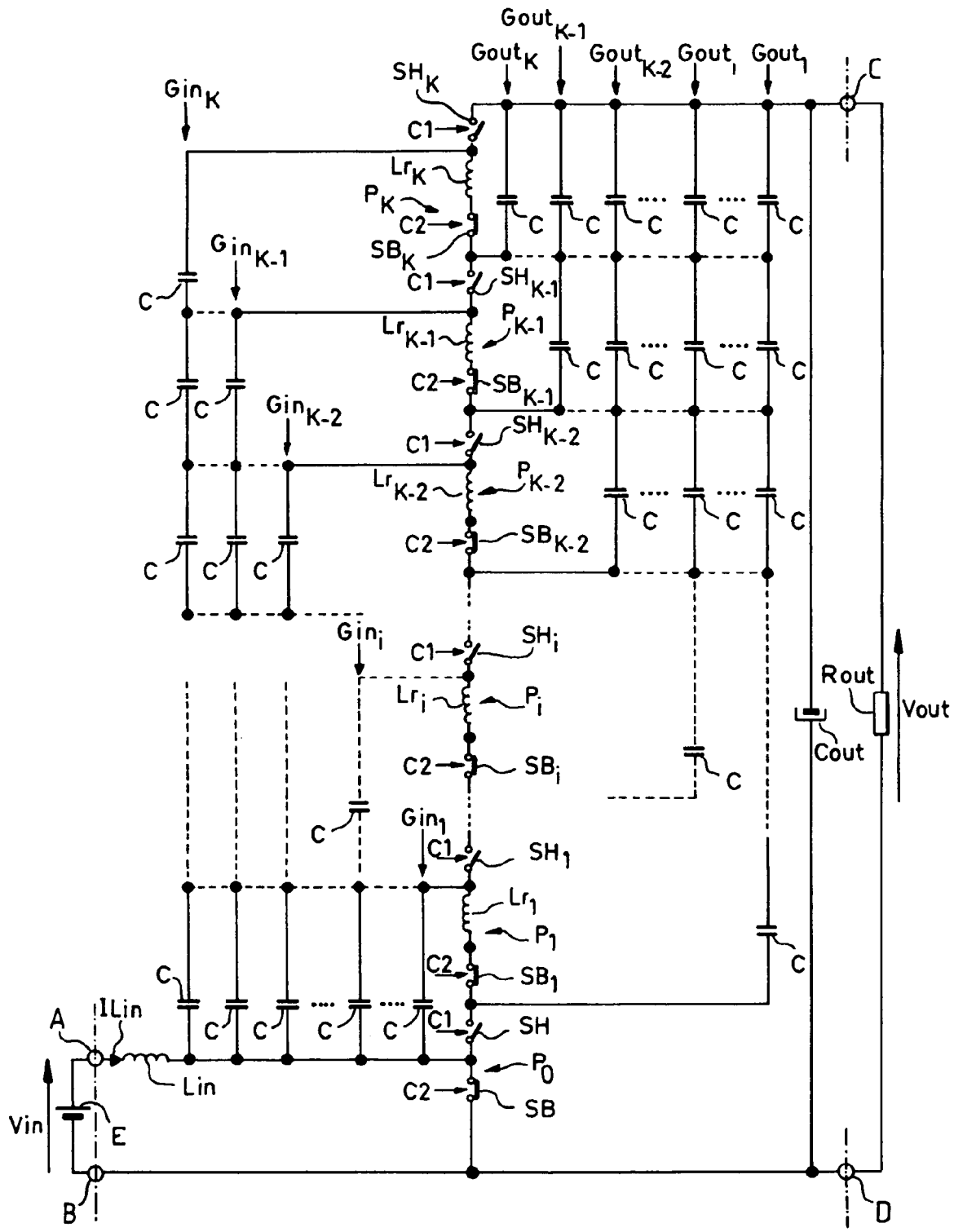
FIG. 2 shows the general structure of the converter according to the invention comprising K pairs of additional switches.

FIG. 2 shows the general structure of the voltage booster converter according to the invention comprising K pairs of additional switches. The converter of FIG. 2 comprises, furthermore, an output filtering capacitor Cout in parallel with the load Rout between the output terminals C and D.

In the general structure of the "boost converter" of FIG. 2 according to the invention the voltages Vc across the terminals of the capacitors of the input groups $Gin_i$ or of the output groups $Gout_i$ have one and the same DC value, thus, the capacitors situated at one and the same level of potential may be linked together. It is thus possible simply to produce various structures of the voltage booster converter that we shall see subsequently.

Figure 3A:
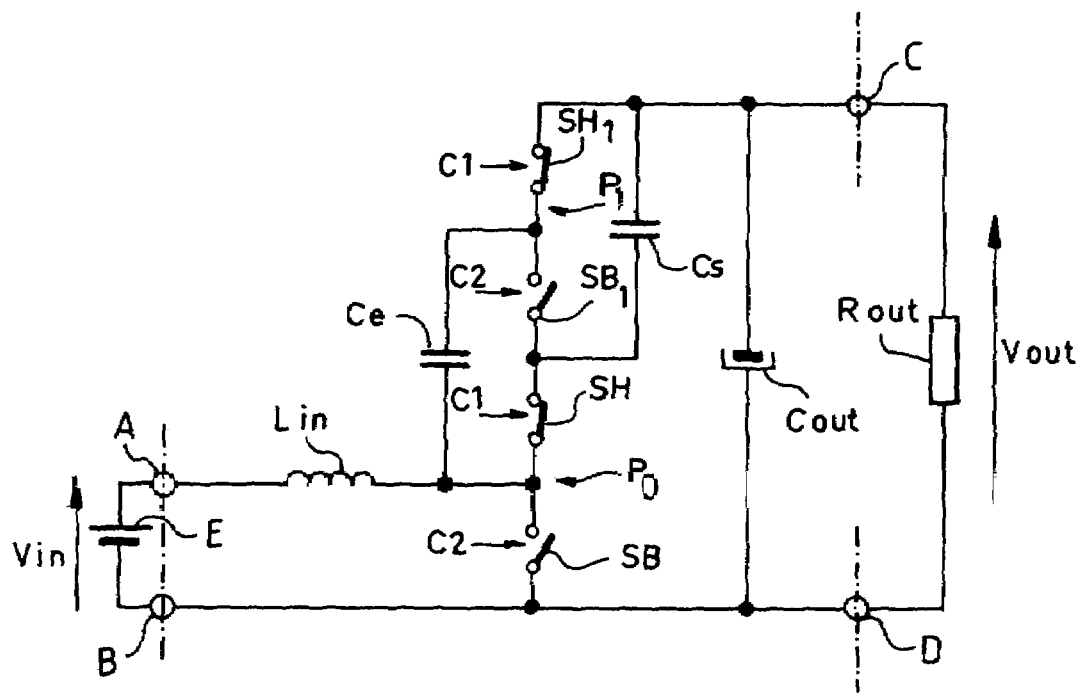
FIG. 3a represents an exemplary embodiment of a voltage booster converter with two stages, according to the invention, without the recovery inductor.

FIG. 3a represents an exemplary embodiment of a voltage booster converter with two stages (a single additional pair), according to the invention, without the recovery inductor, comprising two pairs of switches $P_0$ and $P_1$, each having two switches connected in series. The switches SB, SH for the pair $P_0$ and the switches $SB_1$, $SH_1$ for the additional pair $P_1$. Each switch of a pair comprises a control input so as to be placed simultaneously, the one in an on state by the application to its control input of a first control signal C1, the other in an isolated state by the application to its control input of a second control signal C2 complementary to the first.

Figure 3B:
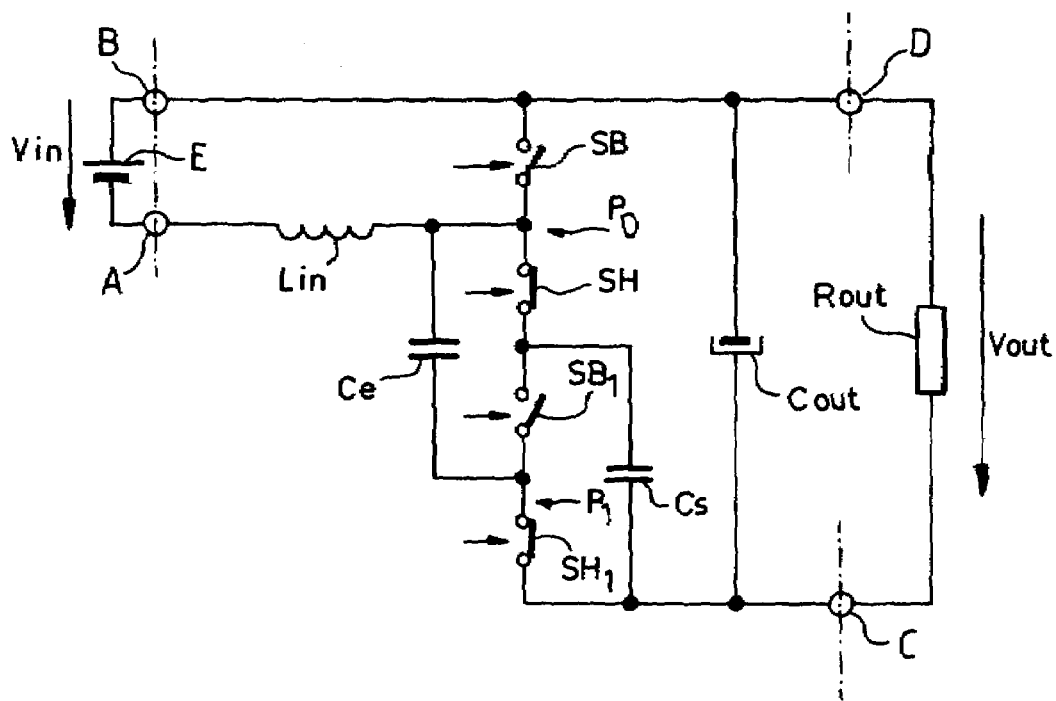

FIG. 3b represents the negative voltage version of the voltage booster converter with two stages of FIG. 3a. The converter of FIG. 3b, of the same structure as that of FIG. 3a, is powered by a generator E providing a negative potential Vin between the input terminals A and B. The polarity of the output capacitor Cout is then inverted.

Figure 4A:
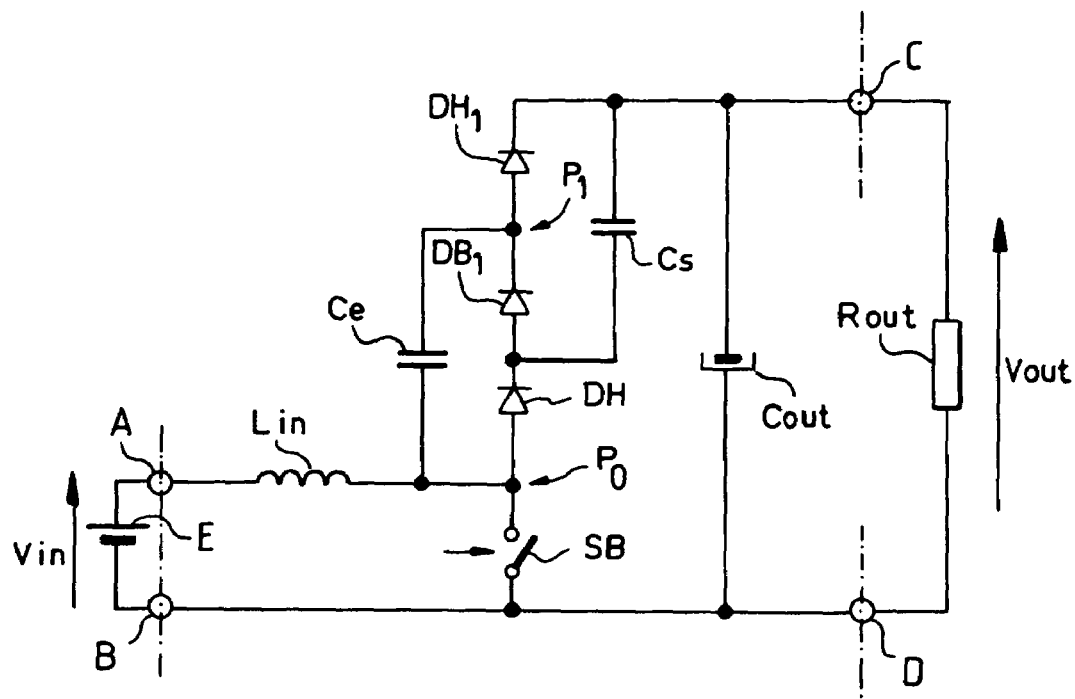

FIG. 4a shows a simplified structure of the booster converter of FIG. 3a comprising two pairs of switches. In this simplified structure, the switches $SB_1$, $SH_1$ of the pair $P_1$ are replaced by diodes $DB_1$, $DH_1$. The switch SH of the pair $P_0$ connected to the pair $P_1$ is also replaced by a diode DH, only the switch SB of the pair $P_0$ must be retained. The cathode of a diode of a pair ($P_0$) is connected to the anode of the diode of the next pair ($P_1$).

Figure 4B:
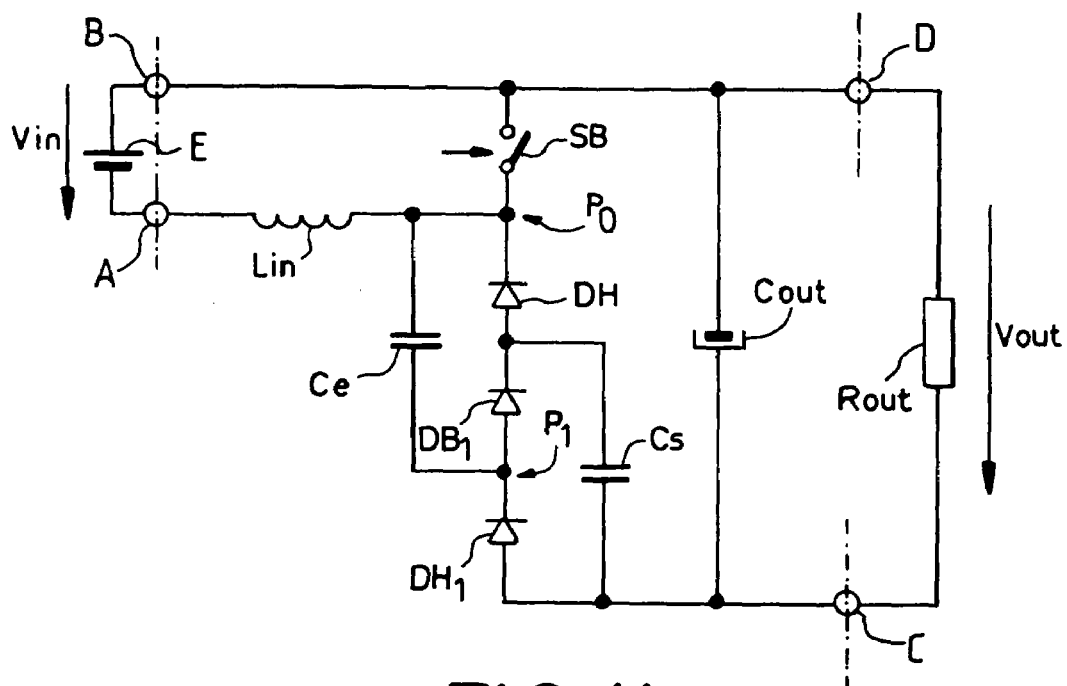

FIG. 4b shows the simplified structure of the negative version of the booster converter of FIG. 3b. In this structure of FIG. 4b, the "mirror" of the structure of FIG. 4a, the anode of the diode of a pair ($P_0$) is connected to the cathode of the diode of the next pair ($P_1$). Just as for the negative voltage version of the converter of FIG. 3b the polarity of the output capacitor Cout is inverted.

Figure 5A:
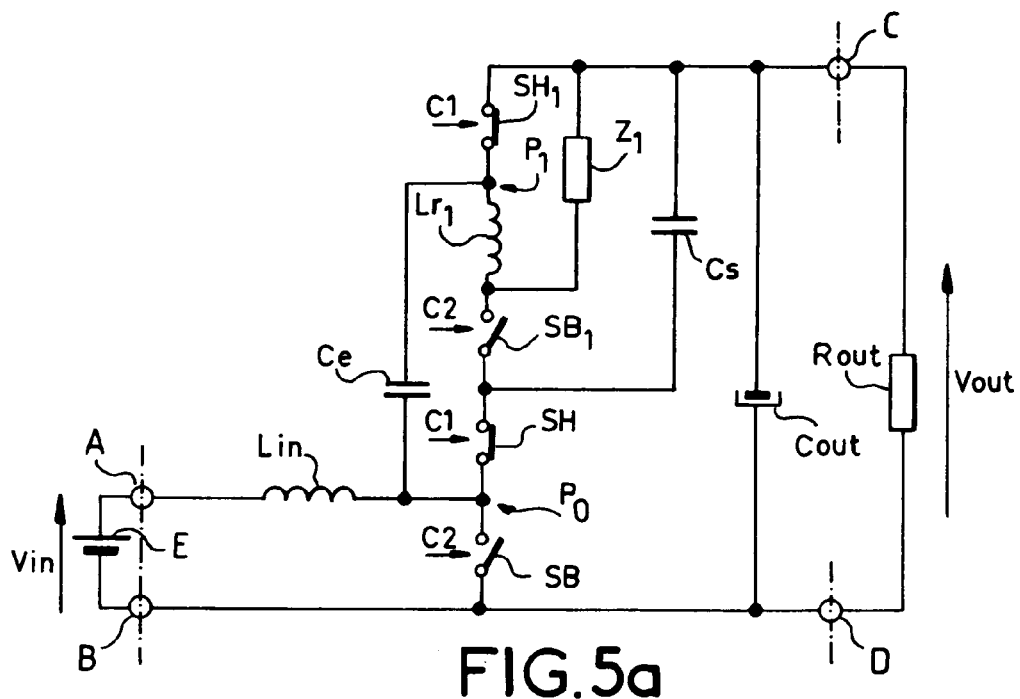
FIG. 5a shows the voltage booster converter of FIG. 3a comprising an energy recovery inductor.

FIG. 5a shows the voltage booster converter of FIG. 3a comprising an energy recovery inductor $Lr_1$ allowing an improvement of the efficiency of the converter. The input capacitor is designated by Ce and the output capacitor by Cs.

We shall, subsequently, explain the manner of operation of the voltage booster converter of FIG. 5a according to the invention.

Figure 6:
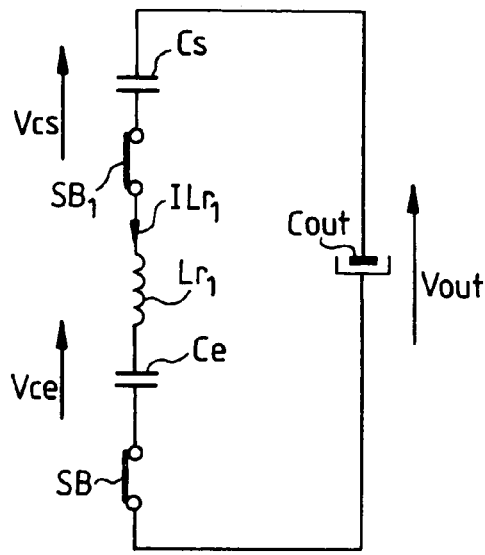
FIG. 6 shows an equivalent diagram of the converter of FIG. 5a according to the invention during the time Ton.

FIG. 6 shows an equivalent diagram of the converter of FIG. 5a according to the invention comprising the recovery inductor $Lr_1$, during the period Ton corresponding to the period of conduction of the switches of the two pairs SB and $SB_1$. During this time Ton the switches SB and $SB_1$ are closed, the switches SH and $SH_1$ are open, the output capacitor Cout is in parallel with the two capacitors Ce and Cs in series with the recovery inductor $Lr_1$.

The recovery inductor $Lr_1$ is sized so as to obtain a resonance of the oscillating circuit of FIG. 6 such that:

$$Ton \geq \pi\sqrt{Lr_1 \cdot Ceq}$$

with $$Ceq = \frac{1}{\frac{1}{Cout} + \frac{1}{Ce} + \frac{1}{Cs}}$$

For an optimal result, Ton is constant and equal to around half the period of the resonant frequency of the equivalent circuit of FIG. 6.

Figure 5B:
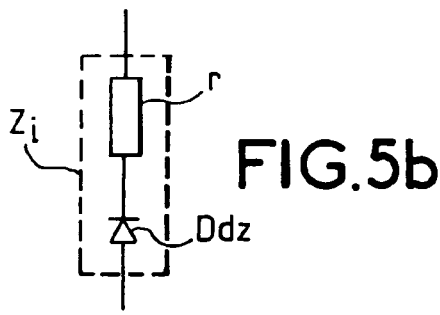
FIG. 5b shows a first version of an impedance $Z_i$ for enhancing the reliability of the converter according to the invention.
Figure 5C:
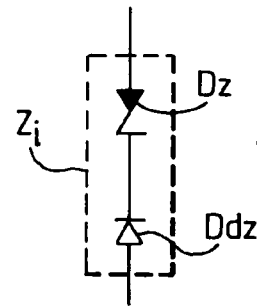
FIG. 5c shows another impedance $Z_i$ for enhancing the reliability of the converter according to the invention.
Figure 5D:
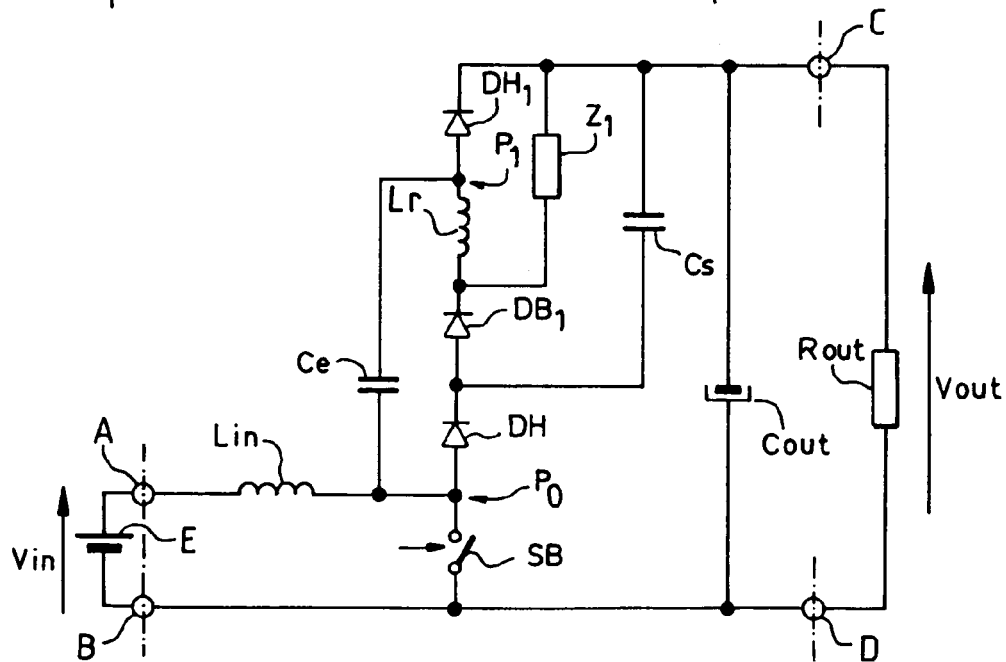
Figure 6A:
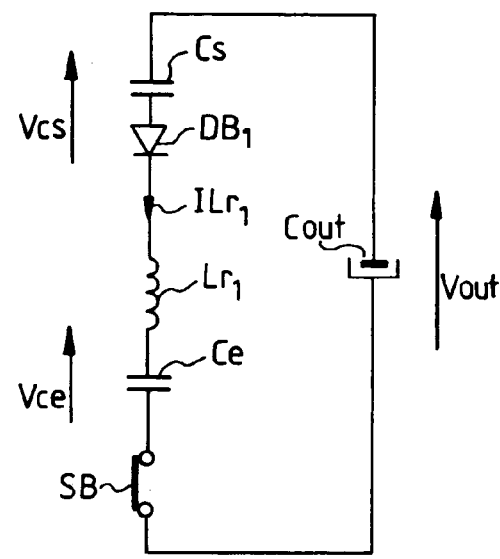
FIG. 6a shows an equivalent diagram of the converter of FIG. 5d according to the invention during the time Ton.

FIG. 6a shows an equivalent diagram of the converter of FIG. 5d according to the invention during the time Ton.

In the case of FIG. 6a, the diode DB1 automatically opens the resonant circuit upon the zeroing of the current in the inductor $Lr_1$. In this case, it suffices for the following relation to be satisfied:

$$Ton \geq \pi\sqrt{Lr_1 \cdot Ceq}$$

Figure 7:
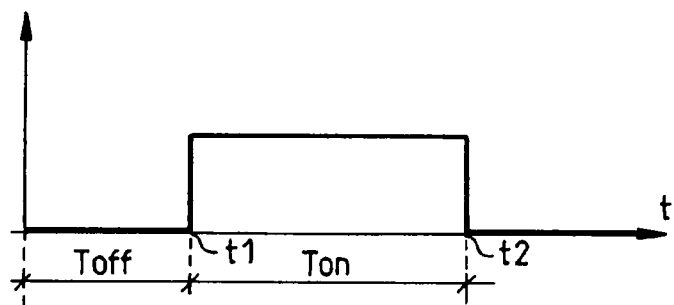

FIG. 7 shows the control signals of the switches SB and SB1 of the converter of FIG. 5a. The other switches are controlled in a complementary manner.

Figure 8:
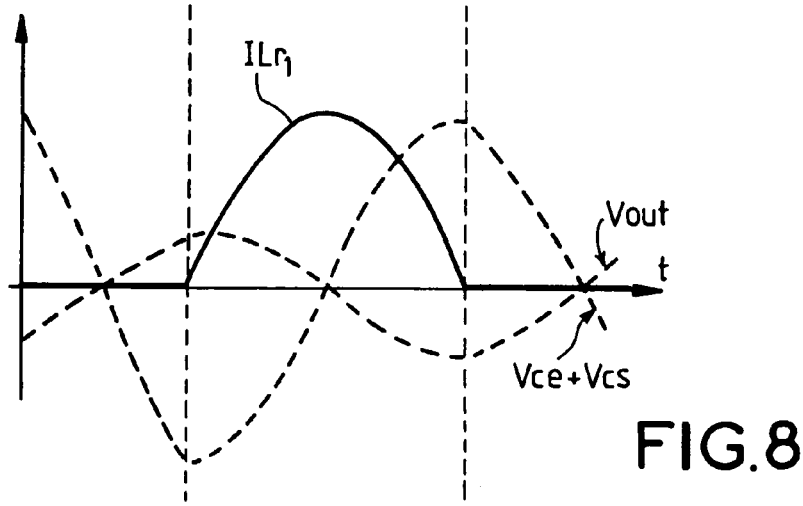

FIG. 8 shows the variation of the current $ILr_1$ in the energy recovery inductor $Lr_1$ as well as the sum of the voltages (Vce+Vcs) across the terminals of the respective input Ce and output Cs capacitors (converter of FIG. 5a).

At the time t1 when toggling from Toff to Ton, the current in the inductor is zero, the voltage (Vce+Vcs) across the terminals of the capacitors Ce and Cs is lower than the mean value of Vout and increases, passing through the mean value of Vout, the current in the inductor $Lr_1$ increases while storing up magnetic energy, passes through a maximum value when (Vce+Vcs) passes through the mean of Vout, then the current decreases down to a zero value, corresponding to the end of Ton, yielding the energy to the capacitors Ce and Cs. During Toff, the current in the inductor Lr1 remains zero, the sum of the voltages (Vce+Vcs) decreases since Ce and Cs are traversed by the current of the inductor Lin, then the cycle recommences at the start of Ton.

Figure 7A:
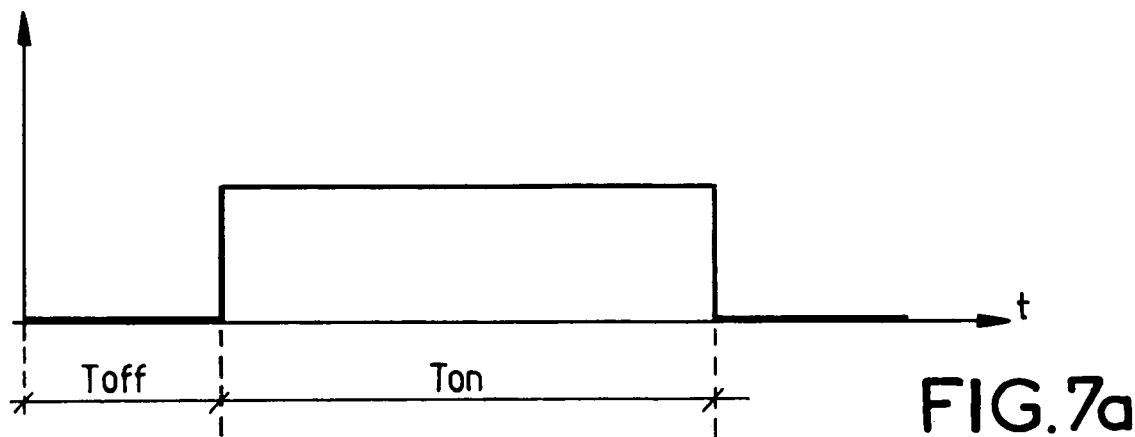
FIG. 7a shows the control signals of the switches SB of the converter of FIG. 5d.
Figure 8A:
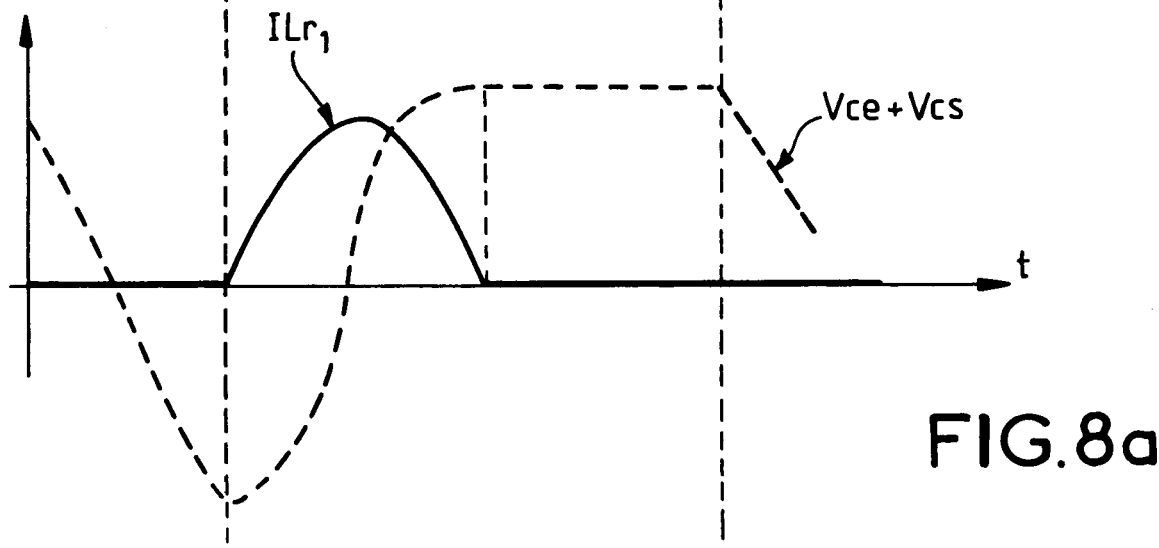
FIG. 8a shows the variation of the current in the energy recovery inductor of the converter of FIG. 5d.

FIG. 7a shows the control signals of the switches SB of the converter of FIG. 5d. FIG. 8a shows the variation of the current in the energy recovery inductor of the converter of FIG. 5d.

Figure 9:
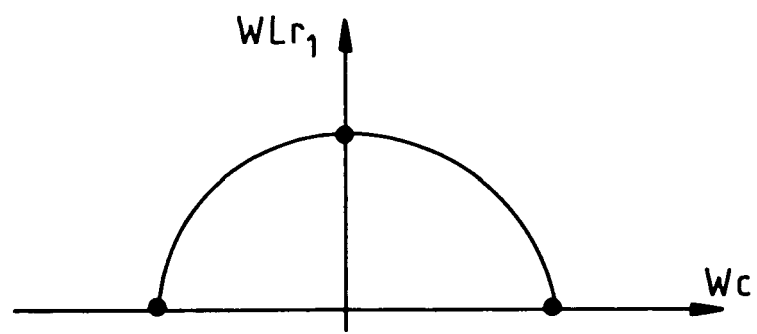
FIG. 9 represents the energy space of the recovery inductor $Lr_1$ and of the capacitor Ceq of FIG. 6.

FIG. 9 represents the energy space of the recovery inductor $Lr_1$ and of the capacitor Ceq of the converter. The abscissa axis represents the capacitive energy Wc, the ordinate axis the inductive energy $WLr_1$, the energy variation between the inductor and the capacitors occurring in the time Ton. The energy is transferred from the capacitors to the recovery inductor then yielded to the capacitors.

The tuning of the circuit of the converter to the operating frequency with the recovery inductor $Lr_1$ considerably reduces the losses of rebalancing of charges in the capacitors Ce and Cs in the circuit of the "boost converter" according to the invention. These losses then become practically zero. This improvement of the converter of FIG. 3a with recovery inductors is applicable in the general case to K additional pairs of switches (see FIG. 2).

Furthermore, in order to make the booster converter according to the invention more reliable, the converter represented in FIG. 5d comprises in parallel with the recovery inductor $Lr_1$ in series with the switch $SH_1$ of the pair $P_1$ an impedance $Z_1$.

Specifically, in practice, Ton does not represent perfectly half the resonant period of the equivalent circuit of FIG. 6, the impedance $Z_1$ makes it possible to dissipate the residual current and protect the switches which are generally MOS transistors.

This improvement of the converter of FIG. 5a is applicable in the general case, thus each additional pair $P_i$ of the converter according to the invention comprises in parallel with the recovery inductor $Lr_i$ in series with the switch $SH_i$ of the pair $P_i$ an impedance $Z_i$.

FIG. 5b shows a first version of the impedance $Z_i$ for enhancing the reliability of the converter according to the invention. The impedance $Z_i$ comprises a diode Ddz in series with a resistor r, the anode of the diode Ddz being linked, in the circuit of the converter, to the recovery inductor and in a second version, shown in FIG. 5c, another impedance $Z_i$ comprises the diode Ddz in series with a Zener diode Dz, the two cathodes of the diode Dd and the Zener diode Dz being linked together, the anode of the diode Ddz being linked, in the circuit of the converter, to the recovery inductor.

Other types of impedance $Z_i$ for dissipating the residual energy of the inductor $Lr_i$ may of course be used, for example RC or RCD cells used conventionally in the field of power electronics.

FIG. 5d shows a simplified version of the voltage booster converter of FIG. 5a comprising two pairs of switches $P_0$ and $P_1$ and a recovery inductor $Lr_1$. In this simplified structure, the switches $SB_1$ and $SH_1$ of the pair $P_1$ are replaced by diodes $DB_1$ and $DH_1$. The switch SH of the pair $P_0$ connected to the pair $P_1$ is also replaced by a diode DH, only the switch SB of the pair $P_0$ has to be retained, the cathode of a diode of a pair being connected to the anode of the diode of the next pair. As in the booster converter of FIG. 5a using switches, the two diodes of the pair $P_1$ are linked in series across a recovery inductor $Lr_1$.

The embodiment of the simplified voltage booster converter with diodes remains valid for any number of additional pairs, thus, in the general case, the switches $SB_i$ and $SH_i$ of the additional pairs $P_i$ are replaced respectively by diodes $DB_i$ and $DH_i$. The switch SH of the pair $P_0$ connected to the pair $P_1$ is a diode DH, only the switch SB of the pair $P_0$ has to be retained. The cathode of a diode of a pair $P_{i-1}$ being connected to the anode of the diode of the next pair $P_i$. As in the booster converter with switches of FIG. 5a, the two diodes of the pair $P_i$ are linked in series across a recovery inductor $Lr_1$.

The explanation of the manner of operation of the series converter comprising the recovery inductor $Lr_1$ with two pairs (K=1) remains valid for any number of K additional pairs. Specifically, the currents in the various pairs $P_i$ and in the corresponding recovery inductor $Lr_i$ are the same, the number of elementary capacitors C in the groups placed in series by the switches being the same.

The voltage booster converter general structure represented in FIG. 2 makes it possible to simply embody various other practical structures and to determine directly the value of the capacitors in each input or output branch.

Specifically, as was stated previously, in the general structure of FIG. 2 comprising capacitors C of like value, the voltages Vc across the terminals of each of the capacitors are the same for the input groups and the same for the output groups, therefore, the capacitors of one and the same level of potential may be connected in part or in whole in parallel.

The capacitors of one and the same potential level $Nin_1$ are, for example, all those of the input groups $Gin_1$, $Gin_2$ ... $Gin_i$, ... $Gin_{K-1}$, $Gin_K$ having an electrode connected to the common point between the two switches of the pair $P_0$, of a potential level $Nin_2$, all those connected by an electrode to the free electrodes of the capacitors of the level $Nin_1$ and by the other electrode to those of the next level $Nin_3$ and so on and so forth up to the level $Nin_K$.

Likewise, for the capacitors of the output groups, we shall have the level $Nout_1$ for all those of the output groups $Gout_1$, $Gout_2$, ... $Gout_i$, ... $Gout_{K-1}$, $Gout_K$ having an electrode connected to the common point between the two pairs of switches $P_0$ and $P_1$, of a potential level $Nout_2$ all those connected by an electrode to the free electrodes of the capacitors of the level $Nout_1$ and by the other electrode to those of the next level $Nout_3$ and so on and so forth up to the level $Nout_K$.

The dotted lines in the diagram of FIG. 2 represent the possible connections between the capacitors C of like value.

Figure 10A:
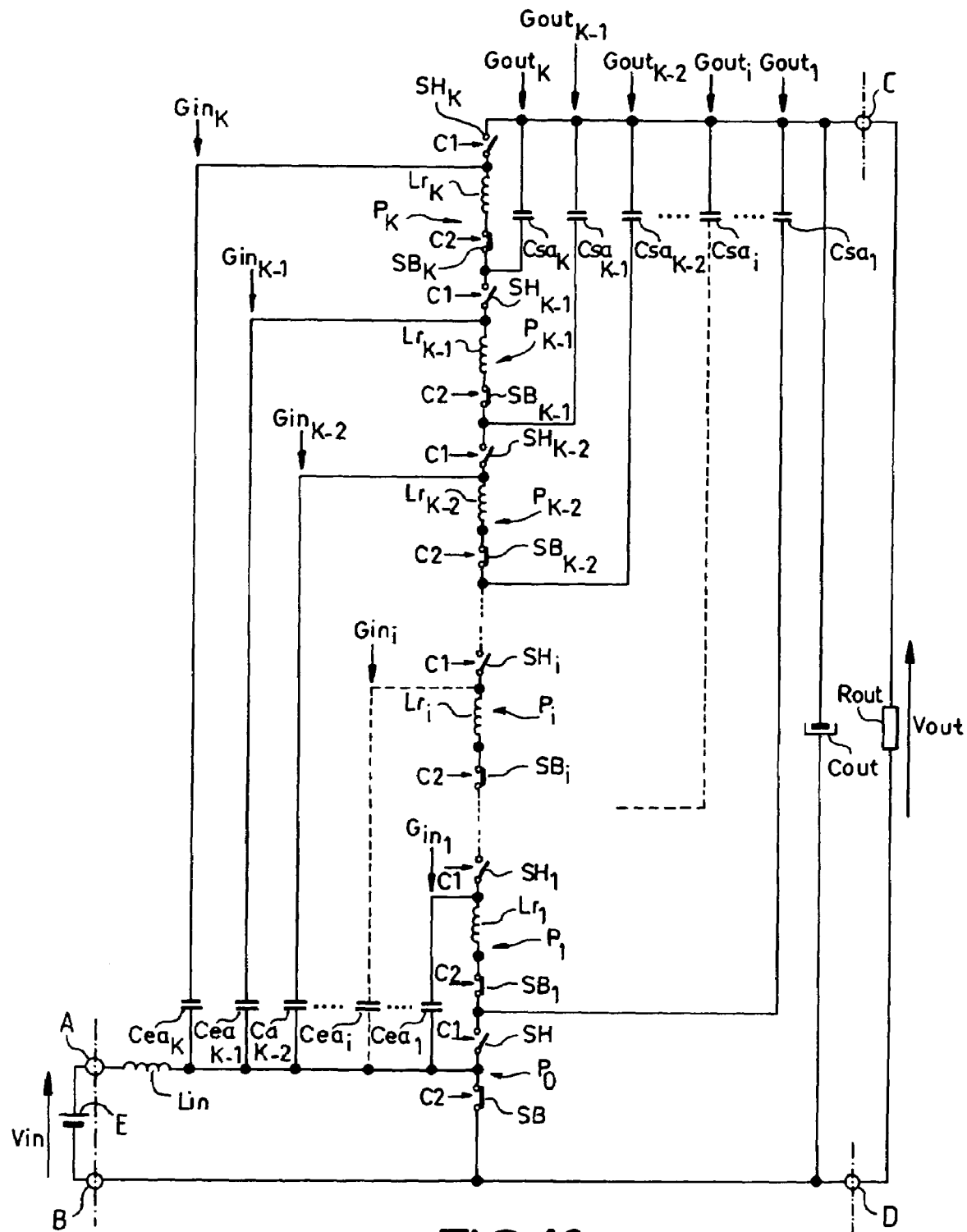
FIG. 10a represents a first practical structure of the converter according to the invention not comprising any interconnections between the capacitors of one and the same level of potential.

FIG. 10a represents a first practical structure of the converter according to the invention not comprising any interconnections between the capacitors of one and the same level of potential, each of the input $Gin_i$ or output $Gout_i$ groups respectively comprises a single capacitor $Cea_1$, $Cea_2$, ... $Cea_i$ ... $Cea_K$, for the input groups $Gin_i$ and $Csa_1$, $Csa_2$ ... $Csa_i$ ... $Csa_K$, for the output groups $Gout_i$.

The value of each of the input capacitors $Cea_i$ is deduced simply from the general structure by calculating the resultant capacitance of the Ni=i capacitors C in series, with i=1, 2, ... K, i being the order of the input group considered:

| | |
|---|---|
| $Cea_1 = C$ | i = 1 |
| $Cea_2 = C/2$ | i = 2 |
| ... | |
| $Cea_i = C/i$ | i |
| ... | |
| $Cea_K = C/K$ | i = K |

The value of each of these output capacitors $Csa_i$ is deduced simply from the general structure by calculating the resultant capacitance of Mi=(K+1)−i capacitors C in series, i being the order of the output group considered:

| | |
|---|---|
| $Csa_1 = C/K$ | i = 1 |
| $Csa_2 = C/(K-1)$ | i = 2 |
| ... | |
| $Csa_i = C/(K+1)-i$ | i |
| ... | |
| $Csa_K = C$ | i = K |

Figure 10B:
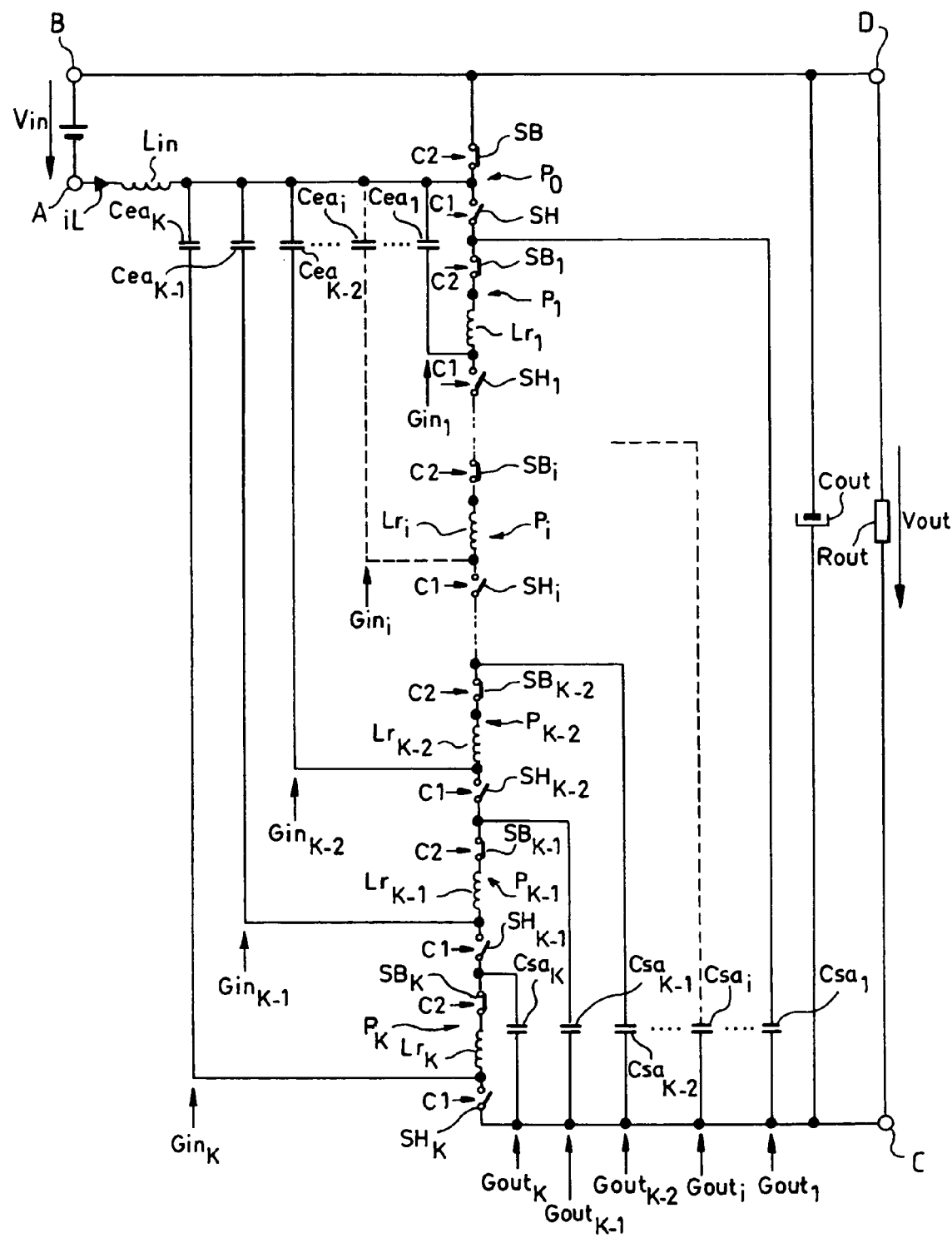

FIG. 10b represents the first practical structure of the converter of FIG. 10a in a negative version not comprising any interconnections between the capacitors of one and the same level of potential.

Figure 11:
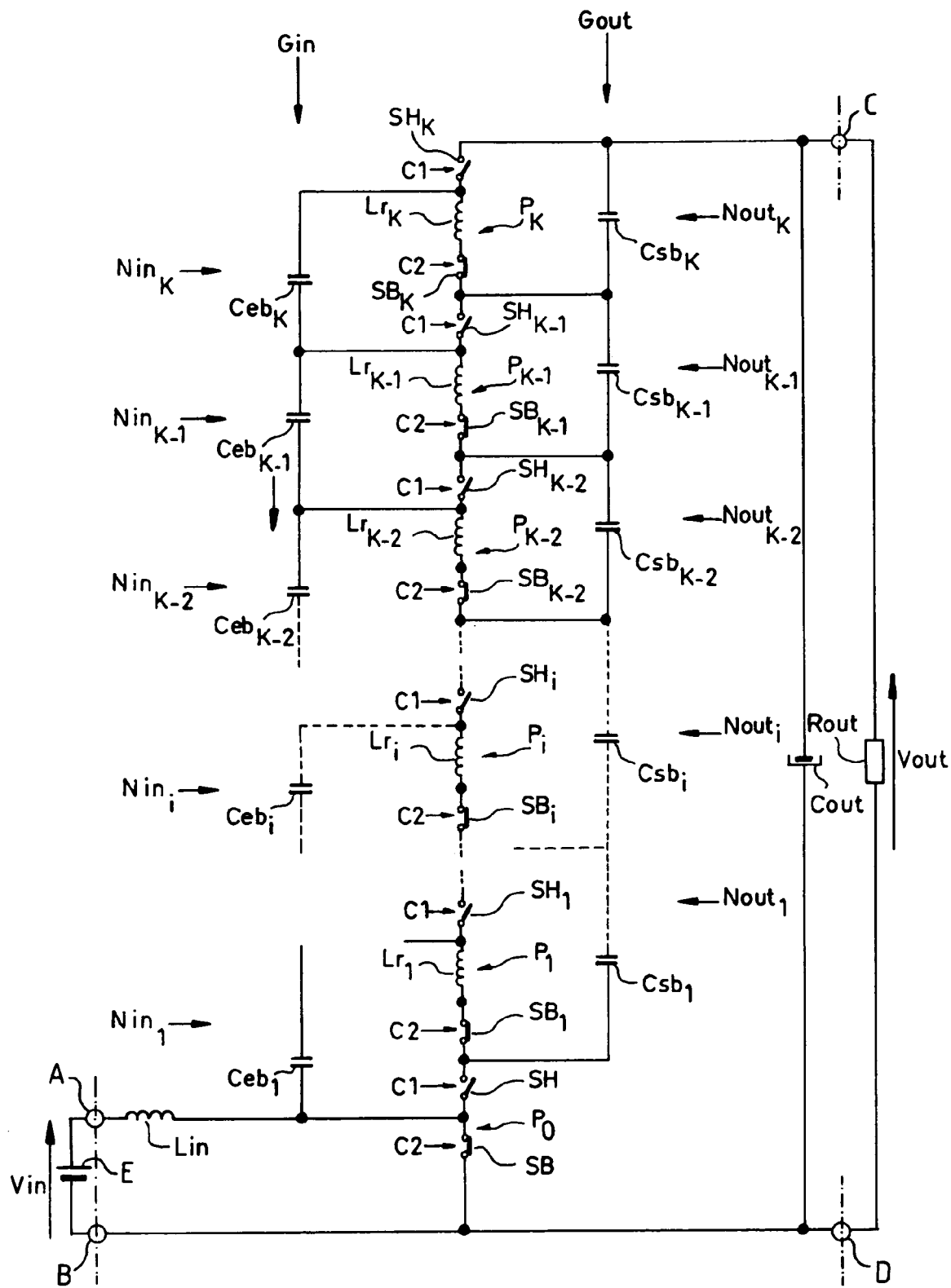
FIG. 11 represents another practical structure comprising interconnections between the capacitors of one and the same level of potential.

FIG. 11 represents another practical structure of the converter according to the invention, in a positive version, comprising interconnections between the capacitors of one and the same level Nv of potential (capacitors in parallel), the structure comprises a single input group Gin and a single output group Gout. The input capacitor $Ceb_i$, for each of the potential levels $Nin_i$, connected between the connection points of the switches of two consecutive pairs $P_i$, $P_{i-1}$, will be deduced simply by calculating the capacitor $Ceb_i$ equivalent to the capacitors in parallel of the level $Nin_i$, of potential considered, i.e.:

| | |
|---|---|
| $Ceb_1 = C.K$ | i = 1 |
| $Ceb_2 = C.(K-1)$ | i = 2 |
| ... | |
| $Ceb_i = C.((K+1)-i)$ | i |
| ... | |
| $Ceb_K = C$ | i = K |

The output capacitor $Csb_i$ of each of the levels of potential $Nout_i$, connected in parallel with its respective pair of switches $P_i$ will be deduced simply by calculating the capacitor $Csb_i$ equivalent to the capacitors in parallel of the level $Nout_i$ considered, i being the order of the output level of potential considered, i.e.:

| | |
|---|---|
| $Csb_1 = C$ | i = 1 |
| $Csb_2 = C.2$ | i = 2 |
| ... | |
| $Csb_i = C.((K+1)-i)$ | i |
| ... | |
| $Csb_K = C.K$ | i = K |

Figure 12:
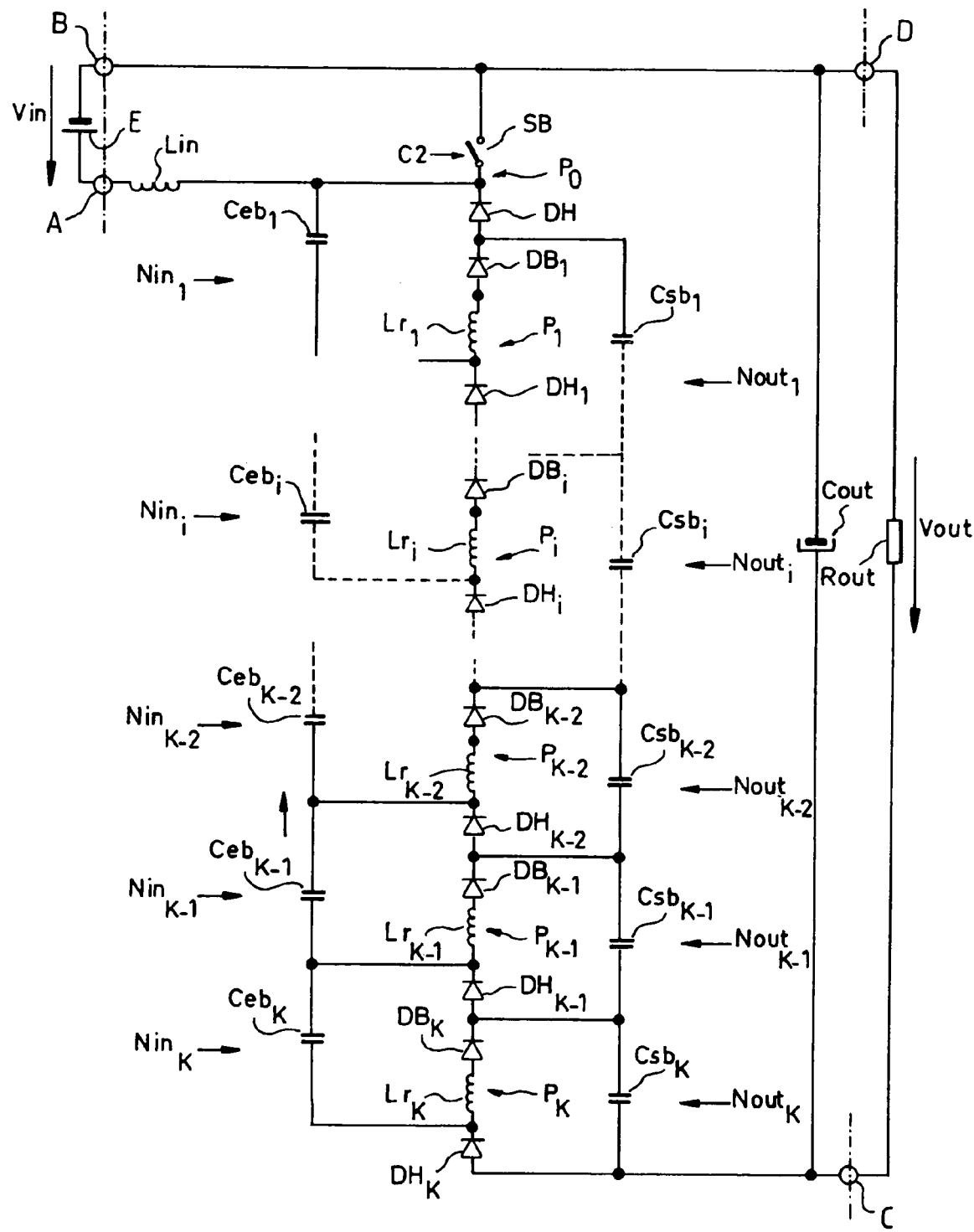
FIG. 12 represents the negative version of the converter of FIG. 11.

FIG. 12 represents the voltage booster converter of FIG. 11, in a simplified negative voltage version, comprising interconnections between the capacitors of one and the same potential level Nv. In this simplified version, the switches $SB_i$ and $SH_i$ of the additional pairs $P_i$ are replaced respectively by diodes $DB_i$ and $DH_i$. The switch SH of the pair $P_0$ connected to the pair $P_1$ is a diode DH, only the switch SB of the pair $P_0$ has to be retained. The anode of a diode of a pair $P_{i-1}$ being connected to the cathode of the diode of the next pair $P_i$. The converter of FIG. 12, of the same structure as that of FIG. 11, is powered by a generator E providing a negative potential Vin between the input terminals A and B. The voltage Vout being negative, the polarity of the output capacitor Cout is then inverted.

In other embodiments it is of course possible to combine the two types of practical embodiments by placing capacitors in parallel for certain groups and in series for others.

It is also possible to embody conversion structures by combining several converters in parallel, be they positive and/or negative. The control signals of the converters of the conversion structure may then advantageously be out of phase so as to reduce the input and/or output current ripples of the booster converters.

The booster converter according to the invention makes it possible to obtain greater efficiencies than the voltage booster converters of the prior art with voltage ratios Vout/Vin of appreciably greater than five.

The invention claimed is:

1. A voltage booster converter comprising:

a pair of input terminals A and B for connecting a DC input voltage Vin between these two terminals;

a pair $P_0$ of switches SB, SH in series connected by the switch SB to the input terminal B, the input terminal A being connected across an input inductor Lin to the connection point between the two switches SB and SH in series, each switch SB, SH comprising control means so as to be placed simultaneously, one in an on state the other in an isolated state;

a pair of output terminals C and D, for powering, by an output voltage Vout, a load Rout, the output terminal D being connected to the input terminal B, wherein:

K other additional pairs $P_1, P_2, \ldots P_i, \ldots P_{K-1}, P_K$ of switches in series with the pair $P_0$ between the output terminal C and the switch SH with $i=1, 2, \ldots K-1, K$, the two switches of one and the same additional pair $P_i$ being connected across an energy recovery inductor $Lr_i$;

K input groups, $Gin_1, Gin_2, \ldots Gin_i, \ldots Gin_{K-1}, Gin_K$, of Ni capacitors C of like value each in series, with $i=1, 2, \ldots K-1, K$ and $Ni=i$, the electrode of the capacitors of one of the two ends of each input group being connected to the common point between the two switches SB, SH of the pair $P_0$, at least the electrode of the capacitors of each of the other ends of the input groups being connected respectively to the common point between each the switch $SH_i$ and the recovery inductor $Lr_i$ of the corresponding pair $P_i$ of like rank i, K output groups, $Gout_1, Gout_2, \ldots Gout_i, \ldots Gout_{K-1}, Gout_K$, of Mi capacitors C of like value each in series, with $i=1, 2, \ldots K$ and $Mi=(K+1)-i$, the electrode of the capacitors of one of the two ends of the output groups being connected to the output terminal C, at least the electrode of the capacitors of each of the other ends of the output groups being connected respectively to the connection point between two pairs of consecutive switches $P_{i-1}$, and $P_i$;

in that the switches of these other K additional pairs are controlled so as to form, when the switch SB of the pair $P_0$ linked to the terminal B is switched to the on state for a time Ton, a first capacitor network connected on the one hand across the switch SB to the terminal B and, on the other hand, to the terminal C, comprising the groups of input capacitors in series with the groups of the output capacitors such that a group of input capacitors $Gin_i$ is in series with its respective group of output capacitors $Gout_i$, and in that when the switch SB of the pair $P_0$ linked to the input terminal B is switched to the isolated state for a time Toff these other K pairs of switches form a second capacitor network connected to the terminal A across the input inductor Lin comprising the input group $Gin_K$ in parallel with the output group $Gout_1$, in parallel with groups of input capacitors in series with groups of the output capacitors such that a group of input capacitors $Gin_{i-1}$ is situated in series with a group of output capacitors $Gout_i$.

2. The voltage booster converter as claimed in claim 1, wherein the voltage Vout at the output of the converter is dependent on the duty ratio $\alpha = Ton/(Ton+Toff)$, the capacitors C of the networks having one and the same value, the voltage Vout is given by the relation:

$$Vout = (Vin/(1-\alpha)) \cdot (K+1).$$

3. The voltage booster converter as claimed in claim 1 wherein it provides a positive output voltage Vout, the potential of the terminal A being greater than the potential of the terminal B, the potential of the output terminal C being greater than the potential of the output terminal D.

4. The voltage booster converter as claimed in claim 1 wherein the switches $SB_i$ and $SH_i$ of the additional pairs $P_i$ are diodes $DB_i$ and $DH_i$, and in that the switch SH of the pair $P_0$ connected to the pair $P_1$ is a diode DH, only the switch SB of the pair $P_0$ being retained, the cathode of a diode of a pair $P_{i-1}$, being connected to the anode of the diode of the next pair $P_i$.

5. The voltage booster converter as claimed in claim 1 wherein a first impedance $Z_i$ having a diode Ddz in series with a resistor r, the anode of the diode Ddz being linked, in the circuit of the converter, to the recovery inductor $Lr_1$.

6. The voltage booster converter as claimed in claim 1 wherein another impedance $Z_i$ having a diode Ddz in series with a Zener diode Dz, the two cathodes of the diode Ddz and the Zener diode Dz being linked together, the anode of the diode Ddz being linked, in the circuit of the converter, to the recovery inductor.

7. The voltage booster converter as claimed in claim 1 wherein each of the input $Gin_i$ or output $Gout_i$ groups respectively comprises a single capacitor $Cea_1, Cea_2, \ldots Cea_i, \ldots Cea_K$ for the input group $Gin_i$ and $Csa_1, Csa_2 \ldots Csa_i \ldots Csa_K$, for the output groups $Gout_i$, and in that the value of each of the input capacitors $Cea_i$ is deduced from the general structure by calculating the resultant capacitance of the $Ni=i$ capacitors C in series, with $i=1, 2, \ldots K$, i being the order of the input group considered:

| | |
|---|---|
| $Cea_1 = C$ | $i = 1$ |
| $Cea_2 = C/2$ | $i = 2$ |
| ... | |
| $Cea_i = C/i$ | $i$ |
| ... | |
| $Cea_K = C/K$ | $i = K$ | the value of each of these output capacitors $Csa_i$ being deduced from the general structure by calculating the resultant capacitance of $Mi=(K+1)-i$ capacitors C in series, i being the order of the output group considered:

| | |
|---|---|
| $Csa_1 = C/K$ | $i = 1$ |
| $Csa_2 = C/(K-1)$ | $i = 2$ |
| ... | |
| $Csa_i = C/(K+1)-i$ | $i$ |
| ... | |
| $Csa_K = C$ | $i = K$ |

8. The voltage booster converter as claimed in claim 1 wherein interconnections between the capacitors of one and the same level Nv of potential, the structure having a single input group Gin and a single output group Gout, and in that the input capacitor $Ceb_i$, for each of the potential levels $Nin_i$, connected between the connection points of the switches of two consecutive pairs $P_i, P_{i-1}$, will be deduced simply by calculating the capacitor $Ceb_i$ equivalent to the capacitors in parallel of the level $Nin_i$, of potential considered, i.e.:

| | |
|---|---|
| $Ceb_1 = C \cdot K$ | $i = 1$ |
| $Ceb_2 = C \cdot (K-1)$ | $i = 2$ |
| ... | |

-continued

| | |
|---|---|
| $Ceb_i = C \cdot ((K+1)-i)$ | i |
| ... | |
| $Ceb_K = C$ | i = K | the output capacitor $Csb_i$ of each of the levels of potential $Nout_i$, connected in parallel with its respective pair of switches $P_i$ will be deduced simply by calculating the capacitor $Csb_i$ equivalent to the capacitors in parallel of the level $Nout_i$ considered, i being the order of the output level of potential considered, i.e.:

| | |
|---|---|
| $Csb_1 = C$ | i = 1 |
| $Csb_2 = C \cdot 2$ | i = 2 |
| ... | |
| $Csb_i = C \cdot ((K+1)-i)$ | i |
| ... | |
| $Csb_K = C \cdot K$ | i = K |

9. The voltage booster converter as claimed in claim 1 wherein an output filtering capacitor Cout in parallel with the load Rout between the output terminals C and D.

10. The voltage booster converter as claimed in claim 1 wherein it provides a negative voltage, the potential of the terminal A being less than the potential of the terminal B, the potential of the output terminal C being less than the potential of the output terminal D.

11. The voltage booster converter as claimed in claim 1 wherein the switches are semiconductors comprising a control input (control means) so as to be placed simultaneously, one in an on state through the application to its control input of a first control signal, the other in an isolated state by the application to its control input of a second control signal complementary to the first.

12. A conversion structure wherein several positive and negative converters, according to claim 1 in parallel.

13. The conversion structure as claimed in claim 12, wherein the control signals of the converters of the conversion structure are out of phase so as to reduce the input and/or output current ripples of the booster converters.

* * * * *